Oct. 18, 1949.
H. W. JONES
2,484,891
POST-MIXED BLOWPIPE AND METHOD OF
THERMOCHEMICALLY CUTTING METAL
Filed Jan. 20, 1944
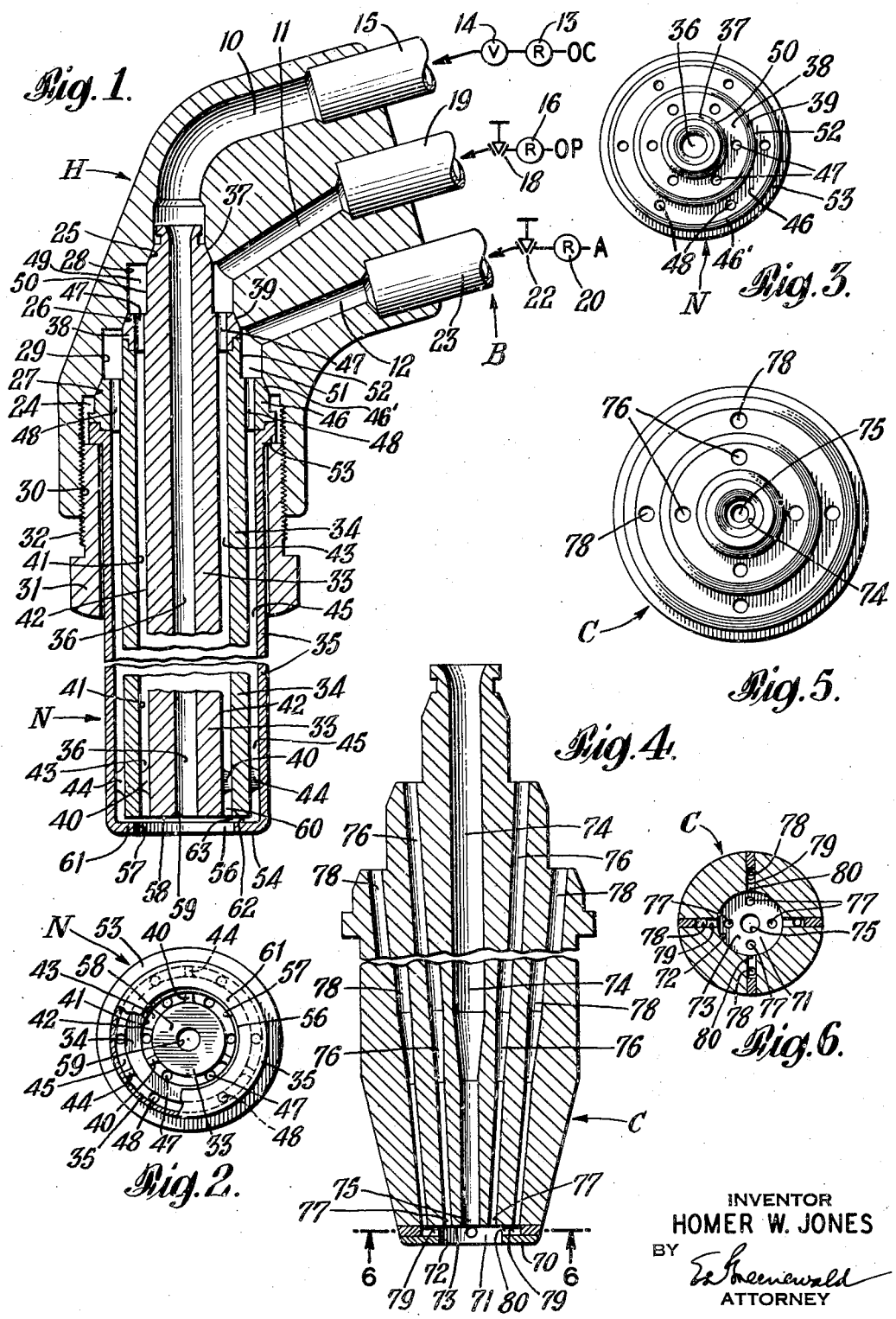
INVENTOR
HOMER W. JONES
BY
ATTORNEY Patented Oct. 18, 1949

2,484,891

UNITED STATES PATENT OFFICE 2,484,891

POST-MIXED BLOWPIPE AND METHOD OF THERMOCHEMICALLY CUTTING METAL

Homer W. Jones, Westfield, N. J., assignor to Union Carbide and Carbon Corporation, a corporation of New York Application January 20, 1944, Serial No. 518,957

3 Claims. (Cl. 148—9)

This invention relates to the art of thermochemically cutting ferrous metal work, and more particularly to such cutting in which a post-mixed oxy-acetylene flame is used for both preheating a local surface area of the work to start the operation and preheating the work for carrying on the operation after it has been started.

Heretofore, it has been customary to heat a portion of the ferrous metal body to be cut to a sufficiently high temperature, commonly known as the kindling or ignition temperature, by a high temperature premixed oxy-acetylene flame, and then to direct a relatively high velocity stream of commercially pure oxygen upon such heated portion so that the ferrous metal upon which the oxygen stream is directed is partially converted to the oxide and swept away by the action of such stream. By progressive movement of the blowpipe nozzle across the ferrous metal body, a portion of the latter substantially corresponding in width to the stream of oxygen is removed and a cut or kerf produced along a line corresponding to the path of movement of the blowpipe. During such movement, exothermic heat created by the oxidation of the metal provides considerable preheat for the cutting operation and the premixed oxy-acetylene preheating flame supplies additional heat to the work during the cutting action. Such preheating flame has been produced in the past by forming a combustible mixture of oxygen and acetylene by a suitable mixer located either in the handle, head or nozzle of the blowpipe.

It has already been proposed to use a relatively soft diffusion type preheating flame composed of externally mixed jets of oxygen and acetylene to carry on the thermochemical cutting operation, but an externally mixed diffusion flame is relatively soft and is ineffective for preheating the work to start the operation. Hence, according to such proposal, it has been necessary to use a premixed oxy-acetylene preheating flame for starting the operation, such premixed oxy-acetylene flame being discontinued after the preheating starting period and replaced by a relatively soft diffusion type externally mixed oxy-acetylene preheating flame. While such proposal reduces flashbacks during the cutting operation, the possibility of flashbacks is still present during the preheating starting period. Furthermore, the apparatus required for carrying out such proposal involves the use of a mixer and relatively complicated means for shifting from the premixed type of oxy-acetylene preheating flame to the externally mixed type at the end of the starting preheat period.

The main objects of this invention are to provide an improved method of thermochemically removing metal from a ferrous metal body in which a post-mixed preheating flame is used for starting the operation and supplying additional heat to maintain the thermochemical reaction; an improved and simple blowpipe apparatus for carrying out such method; and post-mixed cutting nozzles that are simple and economical to manufacture, and efficient and effective for thermochemically cutting metal.

In the drawing:

Fig. 1 is a view mainly in vertical cross section of a post-mixed cutting blowpipe apparatus exemplifying the invention;

Fig. 2 is a view mainly in end elevation of the nozzle shown in Fig. 1, a portion of the face of the nozzle being broken away;

Fig. 3 is a view in end elevation of the gas inlet end of the nozzle shown in Fig. 1;

Fig. 4 is a fragmentary view in vertical cross section of a modified form of post-mixed nozzle exemplifying the invention;

Fig. 5 is a top plan view of the nozzle shown in Fig. 4; and

Fig. 6 is a cross-sectional view taken on line 6—6 of Fig. 4.

Referring to Figs. 1, 2 and 3 of the drawing, the illustrated blowpipe apparatus comprises a blowpipe B having a head H adapted to receive a nozzle N. The blowpipe head H is provided with a cutting oxygen passage 10, a preheating oxygen passage 11 and an acetylene passage 12. The cutting oxygen passage 10 is connected to a cutting oxygen source OC by conduit means including a pressure regulator 13, a normally-closed valve 14, and a pipe 15. The preheating oxygen passage 11 likewise is connected to a preheating oxygen source OP by conduit means including a pressure regulator 16, a needle valve 18, and a pipe 19. The acetylene passage 12 of the head is connected to an acetylene source A by conduit means including a pressure regulator 20, a needle valve 22, and a pipe 23. The pipes 15, 19 and 23 and the needle valves 18 and 22 preferably constitute parts of the blowpipe B.

The blowpipe head H is provided with a socket 24 having frusto-conical seating surfaces 25, 26 and 27, there being an annular recess 28 between the seating surfaces 25 and 26, and an annular recess 29 between the seating surfaces 26 and 27. The socket 24 is internally threaded at 30 to receive a hollow nut 31 having an externally threaded portion 32. The nut 31 loosely fits the nozzle N and is adapted to secure the latter in position in the socket 24 of the head H. In the example illustrated in Figs. 1, 2 and 3, the nozzle N consists of three parts, to wit: a tubular central part 33, a cylindrical intermediate part 34 and an outer casing 35. The tubular inner part 33 is provided with a longitudinal cutting oxygen discharge passage 36 extending axially throughout the length of the nozzle. The inner end portion of the part 33 has a frusto-conical seating surface 37 adapted to fit the seating surface 25 of the head H, and an annular integral flange 38 having a frusto-conical seating surface 39 adapted to fit the seating surface 26 of the head H. Projections 40 are provided on the inner tubular part 33 to space the inner cylindrical surface 41 of the intermediate part 34 uniformly from the outer cylindrical surface 42 of the inner part 33. A longitudinal annular preheating oxygen discharge passage 43 is thus provided which extends longitudinally of the nozzle N.

Projections 44 are likewise provided on the outer surface of the intermediate part 34 properly to position the casing 35 radially with respect to the intermediate part 34, providing an annular longitudinal acetylene passage 45. An annular integral flange 46 is provided at the inner end of part 34 and has a frusto-conical seating surface 46' which is adapted to fit the seating surface 27 of the head H. The flanges 38 and 46 are provided with a series of annularly spaced preheat oxygen passages 47 and acetylene passages 48, respectively. The passages 47 communicate with an annular preheat oxygen distributing passage 49 formed by the recess 28 in the head and a corresponding recess 50 in the inner end portion of the nozzle part 33. The passages 48 likewise communicate with an annular acetylene distributing passage 51 formed by the recess 29 in the head and a corresponding recess 52 at the inner end of the intermediate nozzle part 34. An annular flange 53 on the outer nozzle part 35 seats against the flange 46 and is adapted to be engaged by the inner end of the hollow nut 31 so that the corresponding frusto-conical seating surfaces between the head and nozzle form gas-tight seals when the nut 31 is tightened.

The three parts 33, 34 and 35 of the nozzle N are constructed at the outer end of the nozzle so as to provide an end face 54, and an open mouth 56 in such end face, the mouth having an annular inner wall 57 and a flat bottom surface 58 parallel to the plane of the end face. The longitudinal cutting oxygen discharge passage 36 terminates in an orifice 59 in the center of the bottom surface 58, which orifice is adapted to discharge a stream of cutting oxygen through the mouth 56. The preheating oxygen discharge passage 43 also extends longitudinally of the nozzle and terminates in an annular port 60 located in the surface 58, the port 60 being concentric with the cutting oxygen orifice 59 and being adapted to discharge an annular jet of oxygen through the mouth 56. The outer end of the casing 35 is provided with an inturned annular flange 61 to form the inner annular wall 57 of the mouth 56 and to provide a radial acetylene discharge passage 62 which terminates in a constricted annular outlet 63 adjacent and around the oxygen port 60. The outlet 63 is adapted to discharge acetylene against the annular oxygen jet discharged from the port 60, the inner wall 57 being slightly spaced radially outwardly from the preheating oxygen port 60 so that the oxygen jet aspirates low-pressure acetylene and mixes therewith immediately upon both gas streams leaving the nozzle and discharging into the atmosphere, to produce, when ignited, a post-mixed oxy-acetylene flame. Thus, the preheat oxygen mixes with acetylene outside of the nozzle N and, by having the acetylene outlet passage 62 approximately perpendicular to the preheat oxygen passage 43 and its port 60, an injector action is obtained, so that this type of nozzle functions efficiently even when supplied with acetylene at low pressure.

To start the operation of the blowpipe apparatus illustrated in Figs. 1, 2 and 3, the preheating oxygen pressure regulator 16 is set at some predetermined medium pressure and the acetylene pressure regulator 20 is set to a predetermined medium pressure or low pressure. The preheating oxygen and acetylene needle valves 18 and 22 are then opened so that an annular jet of preheating oxygen is discharged from the port 60, which jet aspirates acetylene from the annular outlet 63. These gases mix immediately outside of the nozzle and, when ignited, produce an annular post-mixed oxy-acetylene flame. Such flame is adjusted to obtain a desired work preheating characteristic by manipulating the preheating oxygen and acetylene needle valves 18 and 22. Assuming that such adjustments have been made, and that the cutting oxygen pressure regulator 13 has also been adjusted to deliver the cutting oxygen at a suitable constant pressure for cutting, the blowpipe B is positioned with respect to the work so that the annular post-mixed flame is applied to a local surface area of the work. The blowpipe is held in such position until the post-mixed flame heats such area to the ignition temperature of the metal with oxygen. Thereupon, the cutting oxygen valve 14 is opened so that a stream of cutting oxygen is discharged from the orifice 59 centrally through the annular post-mixed preheating flame and against the heated area of the work. At the same time, or slightly prior to such time, the blowpipe B is moved relatively to the work while the post-mixed preheating flame remains burning to perform the cutting or metal-removing operation.

Referring to the modification shown in Figs. 4, 5, and 6, the post-mixed cutting nozzle C comprises a unitary body member having an end face 70. The end face is provided with an open mouth 71 having an annular inner wall 72, and a flat bottom surface 73 parallel to the plane of the end face 70. The nozzle also has a longitudinal cutting oxygen discharge passage 74 terminating in an orifice 75 in the center of the bottom surface 73 which orifice is adapted to discharge a stream of cutting oxygen through the mouth 71. A series of longitudinal preheating oxygen discharge passages 76 terminate in ports 77 located in the surface 73, the ports being adapted to discharge jets of oxygen through the mouth 71. The nozzle is also provided with a series of acetylene passages 78 communicating with radial discharge passages 79 which in turn terminate in outlets 80 located in the inner wall 72, there being an acetylene outlet 80 adjacent each preheat oxygen port 77. The inner wall 72 of the mouth is slightly spaced radially outwardly from the preheating oxygen port 77, and the outlets 80 are adapted to feed acetylene to each preheat oxygen jet, so that each oxygen jet aspirates acetylene and mixes therewith to produce a post-mixed oxy-acetylene flame. The inner end portion of the nozzle C is adapted to fit a socket in a blowpipe head of the type shown in Fig. 1.

The operation of blowpipe apparatus involving the post-mixed cutting nozzle C is substantially similar to that described above in connection with the blowpipe apparatus shown in Figs. 1, 2 and 3. An annular series of post-mixed oxy-acetylene flames is applied to the work to heat a local surface area to the ignition temperature with oxygen, each post-mixed work preheating flame being composed of an oxygen jet and acetylene aspirated inwardly against such oxygen jet. After the work is so heated by such preheating flames, a stream of cutting oxygen is applied to the heated area through the interior of such flames, and the flames and cutting oxygen stream are moved across the work to thermochemically cut the latter.

The above-described nozzles of the present invention are adapted to produce post-mixed flames when supplied with low pressure acetylene or medium pressure acetylene. However, for satisfactory operation with low pressure acetylene, the acetylene passages and outlets in the nozzle should be of sufficient size to insure the delivery of an adequate supply of acetylene to the preheating oxygen jets.

A feature of the present invention resides in the fact that the supply of preheating oxygen can be completely shut off, the impingement of the acetylene stream on the cutting oxygen stream producing adequate preheat flames.

While oxygen and acetylene are preferably used, it will be understood that any suitable oxidizing or combustion-supporting gas may be substituted for oxygen, and any suitable fuel or combustible gas unmixed with oxygen may be substituted for acetylene. In the claims "oxygen" includes any suitable oxidizing gas as well as commercially pure oxygen, and "acetylene" includes any suitable fuel gas which does not contain any combustion-supporting gas.

What is claimed is:

1. The method of cutting ferrous metal work, which comprises, applying an oxyacetylene work-preheating flame to the work to heat a local surface area to the ignition temperature with oxygen; said oxyacetylene work-preheating flame being composed of an oxygen jet and a stream of loss-pressure acetylene aspirated from a constricted orifice into mixing relation with such oxygen jet by the latter; and then, after the work is so heated by said flame, applying a separate stream of cutting oxygen to such heated area through the interior of said flame, and moving the flame and cutting oxygen stream across the work.

2. In the art of thermochemically cutting a ferrous metal body, by applying a gaseous heating flame against successive local surface areas of said body to heat such areas to an ignition temperature, and progressively directing a stream of cutting oxygen against such heated areas, the improvement which comprises producing the combustible gas mixture for maintaining said flame by discharging an individual stream of combustion supporting oxygen into the atmosphere adjacent and substantially parallel to said stream of cutting oxygen and concurrently discharging through a constricted orifice a stream of fuel gas radially against said stream of combustion supporting oxygen as the latter is discharged into the atmosphere, and discharging said stream of combustion supporting oxygen at a higher velocity than said stream of fuel gas, thereby aspirating the fuel gas into the stream of combustion supporting oxygen.

3. A blowpipe comprising a head provided with a socket having three frusto-conical seating surfaces and annular recesses therebetween, a hollow nut threaded into such socket, and a nozzle held in place in such socket by said nut, said nozzle comprising three parts, to wit, a tubular inner part, a cylindrical intermediate part, and an outer casing, said inner part having a longitudinal gas discharge passage extending axially therethrough, and said inner part also having a pair of frusto-conical seating surfaces each mating with the corresponding seating surface in the socket, said intermediate part axially engaging said inner part and having a frusto-conical seating surface mating with the other seating surface in said socket, means spacing said last-named parts to provide a longitudinal annular middle gas discharge passage therebetween, and said outer casing having an annular flange axially engaging said intermediate part, and means spacing the outer part from said intermediate part to provide a longitudinal annular outer gas passage, said outer casing also having an inturned annular flange forming a constricted radial discharge passage for such outer gas passage and a mouth having an inner annular wall radially offset from such middle gas passage, all of said parts being held in place in such socket by said hollow nut.

HOMER W. JONES.

REFERENCES CITED

The following references are of record in the file of this patent:

UNITED STATES PATENTS

| Number | Name | Date |
|---|---|---|
| Re. 16,307 | McCutcheon | Mar. 30, 1926 |
| 1,729,677 | Miller | Oct. 1, 1929 |
| 2,210,402 | Gaines | Aug. 6, 1940 |
| 2,373,309 | Hamilton | Apr. 10, 1945 |

FOREIGN PATENTS

| Number | Country | Date |
|---|---|---|
| 494,218 | Great Britain | Oct. 21, 1938 |
| 299,902 | Germany | Aug. 15, 1917 |
| 300,705 | Germany | May 31, 1919 |
| 617,256 | France | Nov. 19, 1926 |
| 817,708 | France | May 31, 1937 |
| 413,190 | Belgium | Jan. 8, 1936 |

Certificate of Correction

Patent No. 2,484,891                                      October 18, 1949

HOMER W. JONES

It is hereby certified that error appears in the printed specification of the above numbered patent requiring correction as follows:

Column 5, line 50, for "loss-pressure" read *low-pressure*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*